UNITED STATES PATENT OFFICE.

L. O. P. MEYER, OF NEWTOWN, CONNECTICUT.

IMPROVEMENT IN TREATING CAOUTCHOUC AND OTHER VULCANIZABLE GUMS.

Specification forming part of Letters Patent No. 10,741, dated April 4, 1854.

*To all whom it may concern:*

Be it known that I, L. OTTO P. MEYER, a native of Hamburg, Germany, but now residing at Newtown, in the State of Connecticut, have invented a new and useful Improvement in the Manufacture of Caoutchouc and other Vulcanizable Gums; and I do hereby declare the following to be a full, clear, and exact description thereof.

The nature of my invention consists in giving desired forms and shapes to the material commonly known as the hard compound of vulcanized caoutchouc or gutta-percha, or other vulcanizable gums, (which material may be manufactured according to the processes described in Letters Patent of the United States granted to Chas. Goodyear on the 15th June, 1844, and Nelson Goodyear, May 6, 1851,) by heating, hardening, or curing the material while it is covered by and in contact with tin-foil or similar sheets of other metal.

It has been the practice heretofore to give shapes and forms to this material by heating, hardening, or curing it in metallic molds, or in molds of plaster-of-paris or other granular matter; but the use of molds is troublesome and expensive, and the process of heating in granular matter does not produce good finished results compared with my improved method.

I proceed to describe the method of putting my invention into operation.

I take a sheet, mass, or piece of the prepared caoutchouc or compound in its green, unvulcanized, and plastic state. I cover it with tin-foil, which I prefer to any other metal. I then stamp or press the plastic material into the shape or form desired, stamping or pressing at the same time the sheet of tin-foil, so that it shall completely cover and be in contact with the gum, which is easily done because of the thinness and flexibility of the metal. The forms and shapes of material thus covered with tin-foil I subject to the heating process without further care or preparation, preferring, however, to heat the forms or shapes under water, which being elevated to about 300° Fahrenheit will of course be under pressure. It will be found upon the completion of the heating process that the stamped or pressed material will preserve its form and shape by reason of the covering of tin-foil, and that the surface of the material which has been in contact with the metal is smooth as the surface of the metal.

I do not claim as my invention interposing between sheets of gum, &c., to be cured, sheets of flexible material, when the series of sheets thus piled are confined between plates of iron during the process of vulcanization, as this makes no part of my invention, which consists in covering the surface of what is known as the "hard compound of caoutchouc" with tin-foil or other equivalent substance to preserve the form previously given by embossing or molding, the contact of the tin-foil during the curing process having the effect, as I have discovered, to preserve the form and the surface without pressure or molds.

Having thus described the nature of my invention and the mode of putting it into operation, what I claim as my invention, and desire to secure by Letters Patent, is—

The use of tin-foil, or the equivalent thereof, for the purpose of preserving, during the process of heating, the forms or shapes given to the hard compounds of vulcanized caoutchouc and other vulcanizable gums, substantially as herein described.

L. OTTO P. MEYER.

Witnesses:
  C. POPPENHEISER,
  WM. H. BISHOP.